United States Patent [19]
Bandy et al.

[11] Patent Number: 5,243,190
[45] Date of Patent: Sep. 7, 1993

[54] RADIOACTIVE TRACING WITH PARTICLES

[75] Inventors: Thomas R. Bandy, Katy; Donna A. Read, Houston, both of Tex.; Edward S. Wallace, Englewood, Colo.

[73] Assignee: Protechnics International, Inc., Houston, Tex.

[21] Appl. No.: 792,809

[22] Filed: Nov. 15, 1991

Related U.S. Application Data

[60] Division of Ser. No. 666,044, Mar. 7, 1991, Pat. No. 5,182,051, which is a continuation-in-part of Ser. No. 466,238, Jan. 17, 1990, abandoned.

[51] Int. Cl.$^5$ ............................................. G01V 5/00
[52] U.S. Cl. ................................. 250/260; 250/259; 250/356.1; 250/356.2
[58] Field of Search .................. 250/259, 260, 356.2, 250/356.1

[56] References Cited

U.S. PATENT DOCUMENTS

| | | | |
|---|---|---|---|
| 2,943,045 | 6/1960 | Hull et al. | 250/356.2 |
| 2,955,088 | 10/1960 | Beerbower et al. | |
| 3,019,341 | 12/1988 | Monaghan | 250/260 |
| 3,492,147 | 1/1970 | Young. | |
| 3,796,883 | 3/1974 | Smith et al. | 250/260 |
| 3,954,655 | 5/1976 | Case et al. | 252/645 |
| 4,066,718 | 1/1978 | Cooke et al. | 166/280 |
| 4,087,375 | 5/1978 | Tanno | 252/624 |
| 4,547,468 | 10/1985 | Jones et al. | 501/33 |
| 4,668,645 | 5/1987 | Khaund | 501/127 |
| 4,731,531 | 3/1988 | Handke | 250/259 |
| 4,789,501 | 12/1988 | Day et al. | 252/645 |
| 4,996,192 | 10/1985 | Fleischer | 501/1 |
| 5,011,677 | 4/1991 | Day et al. | 424/1.1 |

OTHER PUBLICATIONS

Brochure "Tracerscan Service", Halliburton Logging Services, Inc., 1990.
Article "Tracer Technology Finds Expanding Applications", Petroleum Engineer International, Jun. 1989.
Brochure "Macrolite Ceramic Spheres", 3M Industrial Mineral Products Div., St. Paul, Minn., Jan. 1, 1990.
Article "Tracers Can Improve Hydraulic Fracturing" Petroleum Engineer International, Jun. 1989.
Article "Improved Evaluation Techniques for Multiple Radioactive Tracer Applications", 12th Internatinal Logging Sym. of SAID Paris, France, Oct. 1989.

*Primary Examiner*—Carolyn E. Fields
*Attorney, Agent, or Firm*—Pravel, Hewitt, Kimball & Krieger

[57] ABSTRACT

There is provided radioactive particles having a ceramic matrix and an element which can be bombarded with neutrons to produce a gamma ray-emitting isotope. The particles are manufactured by mixing the ceramic components and the element, forming particles, sintering the particles, and the particles are subsequently made radioactive by bombardment with neutrons. Particles injected into wells or flow apparatus are traced by adding the radioactive particles and detecting the radioactive particles with gamma ray-sensitive instruments. Particles containing different elements are detected by spectral analysis of gamma rays.

19 Claims, 1 Drawing Sheet

RADIOACTIVE TRACING WITH PARTICLES

This is a division of application Ser. No. 07/666,044 filed Mar. 7, 1991, now U.S. Pat. No. 5,182,051, which is a continuation-in-part of U.S. Ser. No. 07/466,238, filed Jan. 17, 1990, now abandoned.

BACKGROUND OF THE INVENTION

1. Field of the Invention

This invention relates to radioactive isotope tracers and methods for their use and manufacture. In one aspect, sintered ceramic particles containing an element having the capability to be made radioactive are provided. In another aspect, radioactive sintered ceramic particles are provided. In still another aspect, a method of manufacturing radioactive particles is provided. In still another aspect, a method of using radioactive particles to locate particles in a wellbore or other piping system with negligible contamination of the system with radioactivity is disclosed.

2. Description of Related Art

Radioactive elements are commonly used for tracing the flow of liquids and solids in flow streams. The elements can be present as a soluble compound in a liquid, as insoluble or slightly soluble particles of the element or a compound of the element suspended in the flow stream, or as a soluble or insoluble compound attached to particles of other material which are suspended in a liquid or gas.

Slurries of particles are pumped into wells drilled through subterranean formations for several reasons. One reason is in connection with hydraulic fracturing of wells. The particles are called "proppant," and such particles function to fill the fracture created in the earth around a well and thereby to allow greater fluid flow rate into or out of the well. It is desirable to know after a well has been fractured the vertical extent of the proppant particles that have been placed around the well—particularly, whether the proppant is located in a zone of the well containing hydrocarbons or whether the proppant has been transported to another zone above or below the hydrocarbon-containing zone. It is common for radioactive particles to be added to the proppant as it is injected into the well. After the fracturing operation is complete, a logging tool is run into the well and the location of the proppant-radioactive particle mixture is located.

Slurries are also used in a well for cementing the casing in the well. The cement slurry is pumped into the well through the casing and flows upward outside the casing. It is important to know where the cement is located outside the casing in the well after it sets. Radioactive tracers are sometimes added to the cement slurry as it is pumped into a well. After the cement has set, a logging tool which measures gamma ray radiation is run into the well and the level of radiation is measured at different depths in the casing of the well. Different radioisotopes may be added to different portions of the cement slurry and the logging tool may be used to measure the location of the different tracers outside the casing. A spectral log may be used to indicate the distance of the tracer from the wellbore.

Another use of slurries in wells is in the process of gravel packing of wells, In this process particles, called "gravel," are placed near the wellbore and in the wellbore outside a screen to prevent formation solids from entering the wellbore or plugging the screen. It is important to know whether the gravel pack is continuous and how far it extends vertically in the well. Radioactive particles are added to the gravel as it is pumped into the well and a logging tool is run into the well after the gravel packing operations are complete to determine the location of the gravel.

Radioactive tracers are used in many other flow systems for measuring flow rates, flow patterns and other phenomena associated with movement of fluids or solids in industry or science. In many of these applications the radioactive tracers are placed directly in a liquid. There is often difficulty from the radioactive material plating on to surfaces or being disseminated through the flow system to contaminate the system with radioactivity.

U.S. Pat. No. 3,492,147 discloses a process for production of resin-coated solids, the resin coating incorporating radioactive materials. U.S. Pat. No. 4,731,531 discloses the use of particulate material which is nonradioactive until it is irradiated by neutrons at the surface of a well immediately before it is injected into the well or after it has been deposited in the formation around the well. The nonradioactive isotope is contained in an infusible resin coated on the surface of the particles. Radioactive particles having an infusible resin on the surface were sold by Halliburton Company under the trademark RAYFRAC®. Other radioactive particles sold for use in the oil industry are believed to be manufactured by simply immersing sand particles in a radioactive solution and drying the particles, the radioactivity then being trapped within natural cracks existing in the sand particles.

Techniques for detecting and measuring radioactivity are well known. A device such as a Geiger Counter will measure total radioactivity. Techniques for measuring the amount of radiation as a function of the energy of the gamma ray are also well known. Each radioactive isotope emits a characteristic spectrum of energies of radiation. Spectral analysis of the gamma rays from a radioactive isotope of an element used in the laboratory and surface facilities is well-known. In recent years, tools have been developed and made available for measuring the spectral analysis of gamma rays in wells. Spectral analysis makes possible use of multiple radioactive tracers in a flow system or well at the same time. In addition, technology has been developed to determine the relative distance from the detecting tool of different tracers, based on the phenomenon of Compton scattering of the gamma rays. One system for use in wells is sold by Halliburton Logging Services, Inc. under the trademark TRACERSCAN. This same detection technology could be used in other flow systems. The spectral log in a well makes possible both the vertical and radial distribution of tracers used in evaluating the effectiveness of hydraulic fracturing, cementing, and gravel packing operations. The article "Tracer Technology Finds Expanding Applications," *Petroleum Engineer International,* June, 1989, pp. 31–36, and references cited therein describe the new spectral analysis technology and its application to wells.

In the application of radiotracers in wells, preferably no tracers are left inside the casing, since only tagged material outside the casing contributes useful information regarding material placement within the formation. A severe limitation in using prior art radioactive particles which are initially radioactive or which are made radioactive by neutron bombardment before injection into a well or piping system is that radioactive material washes off particles or is abraded or is broken from the surface of the particles as they are pumped in a flow stream. This loss of radioactivity from the particles creates a background radiation at certain locations or throughout the well or piping system. The extraneous source of radiation can be a severe limitation in subsequent radioactive logging of wells and greatly diminishes the accuracy of measurements intended to be indicative of conditions outside the wellbore. In piping systems on the surface of the earth, radioactive contamination can be hazardous and can interfere with other operations.

Therefore, there is a great need for particles that can be made radioactive and particles that are radioactive which can be pumped into wells or other flow streams without loss of radioactivity and contamination of the flow stream. Further, a method of manufacturing such particles which allows incorporation of a variety of elements which can produce distinctive radioactive spectra is needed, and a method of employing these particles to locate slurries which have been injected into wells or other piping systems is needed.

SUMMARY OF THE INVENTION

In one embodiment of this invention, sintered ceramic particles which are a precursor to radioactive particles, comprising an element which can be bombarded with neutrons to form an isotope which emits gamma rays, are provided. In another embodiment, radioactive particles are provided. In another embodiment, a method of manufacturing particles specially suited for tracing flow in a fluid or slurry is disclosed. The manufacturing process comprises the steps of mixing in powder form ceramic components and an element which, when bombarded by neutrons forms a radioactive isotope, forming the powder mixture into particles, sintering the particles to produce an effective amount of strength and irradiating the sintered particles with neutrons.

In yet another embodiment, sintered radioactive particles produced by mixing ceramic components and an isotope which can be made radioactive by neutron radiation, which are irradiated by neutrons before use, are added to a non-radioactive slurry as it is pumped into a well. The well is then logged with an instrument which measures the level of radioactivity from the gamma ray emission of the particles. Gamma ray spectra are measured to differentiate tracers when particles containing different elements are injected into the stream at different times. In still another embodiment, particles in surface piping systems are traced using radioactivity measurements. In another embodiment, the precursor particles are bombarded with neutrons after their injection into a well or other flow system.

DESCRIPTION OF THE PREFERRED EMBODIMENTS

Figure 1:
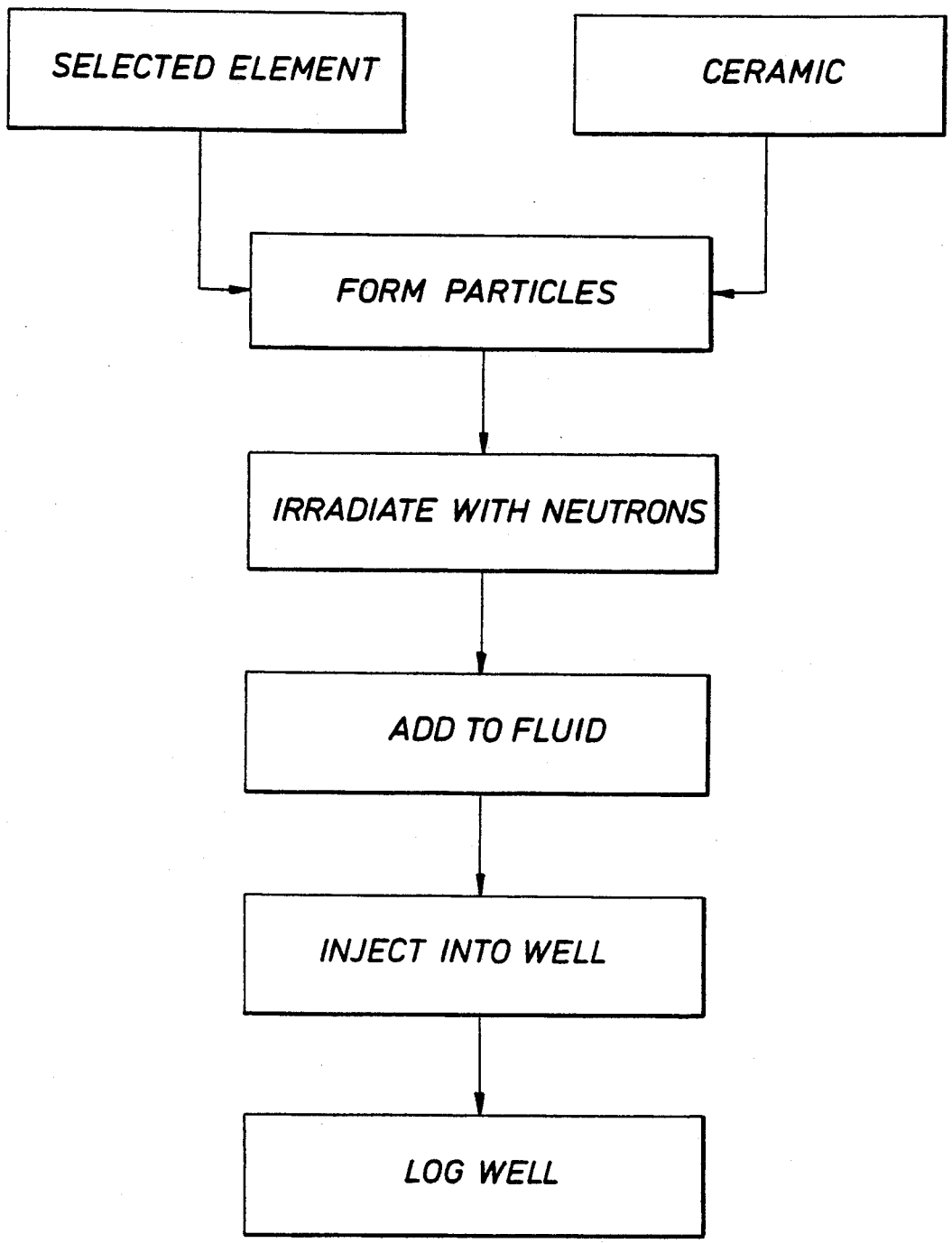
FIG. 1 is a diagram of steps for use of radioactive particles in a well.

The particles which can be made radioactive of the present invention are particles which contain a target element which is embedded in a sintered ceramic matrix.

The radioactive isotope particles of the present invention are ceramic particles that emit gamma rays to allow their detection by instruments. The particles are made of sintered ceramic components and an element which has been bombarded with neutrons to become a gamma ray-emitting isotope.

The ceramic components are common oxides, normally silica or alumina, but other oxides used in the ceramic art may be used. In the mixtures comprising predominantly silica and alumina, a range of mixtures from pure alumina to predominantly silica can be used. Mixed crystalline materials of silica and alumina such as mullite may be used. The ceramic components are first finely divided or powdered and mixed with the target element. By this technique, the target element can be uniformly distributed through the particle. The structure of the powdered starting materials may still be present in the finished particles, but the particles will have an effective amount of strength resulting from bonding of the original powder of ceramic components which has occurred during the sintering process. Other components may be added to aid sintering and to substantially lower the sintering temperature, such components being well known in the ceramics art.

The sintered matrix of the particles should have sufficient strength to resist breaking when the particles are pumped in a stream of fluid. The amount of strength needed will depend upon their application. If the particles are to be pumped at high flow rates in a slurry, such as in hydraulic fracturing treatments in wells, the particles should be strong enough to prevent breaking at high stress, substantially like the ceramic particles now provided as proppant for this application. For added strength, particles having an alumina content above 30 percent by weight are preferred. Also, sintered particles made from very finely divided powder are higher in strength. Powder less than 25 microns in size is preferred. If the radioactive particles are to be incorporated into a flow stream moving at a low speed and without abrasive conditions, much lower strength ceramic particles are acceptable, although high strength will not be a disadvantage. In addition to strength, density and size may be important properties of the ceramic particles to be considered in each application.

The target element added to emit gamma rays is embedded in the matrix of the ceramic materials before sintering. The element is selected based upon several variables. One of the important characteristics is the half-life of the radioactive isotope produced by neutron bombardment. This property is selected based on the measurements to be made and does not limit this invention. Half-lives of from about two days to about 250 days are commonly used. The energies of the gamma rays emitted by the isotope are also an important factor in selecting the element This is especially true when two or more radioactive isotopes are to be used in the same flow stream, when it is desirable that the energy spectra of the different isotopes not excessively overlap It is preferred that the energy spectrum of the gamma rays of the different isotopes not overlap such that the intensity of the gamma rays from each element can be more accurately measured. Thereby, the concentration of each individual isotope can be measured by spectral analysis of the gamma rays.

The cost and availability of the target element embedded in the ceramic particles is one consideration in the selection of which element to use in a particle Target elements suitable for use in the particles of this invention include gold, iodine, iridium, scandium, antimony, silver, hafnium, zirconium, rubidium, chromium, iron, strontium, cobalt, and zinc. Preferred target elements are antimony, iridium, scandium, silver, and hafnium. Most preferred are iridium and scandium.

The target element may be present in its elemental form or as a compound. Compounds of elements useful in this invention are commonly salts or oxides. Iridium oxide is available as a black powder known as "iridium black ". Hafnium oxide is available in pure form Antimony bromide is available is very pure form as crystals. Other compounds of the element may be used, but oxides and salts are readily available. The compound should be stable at the high temperature of processing of the ceramic particle, such that sublimation does not deplete the particles of the compound. The temperature of sintering the particles will normally be above the melting point of the compound of the element.

The concentration of the element in the ceramic particle will depend on the application of the particles, but an effective amount will be less than 5 percent of the weight of the particle, preferably less than 1 percent and most preferably less than 0.5 percent by weight.

Sizes of the particles will normally range from about 8 mesh to about 400 mesh. Particles of a wide range of sizes can be separated into desired sizes by sieving or other particle size separation techniques.

Specific gravity of the particles will range from about 0.5 gm/cc to about 3.9 gm/cc. Particles of different densities can be made and separated by density using well known particle separation techniques.

Radioactive ceramic particles may be manufactured by methods known in the ceramic industry for manufacturing proppants for use in hydraulic fracturing of wells or for manufacturing synthetic gravel for use in gravel packing of wells. Such ceramic particles for proppants are manufactured and used for their strength, their density and their sphericity. U.S. Pat. 4,668,645 discloses a particle for use as a proppant and a method of manufacturing such particles. U.S. Pat. No. 4,068,718 discloses the use of high strength and high density bauxite-containing particles for use as a proppant in wells and describes the methods of manufacture of such particles. The two aforesaid U.S. patents are incorporated herein for all purposes.

Other methods for manufacturing sintered ceramic particles from powder, employing a variety of grinding, mixing, pelletizing and sintering techniques can be used. Ceramic particles of various densities and strengths can be made by mixtures of the oxides of aluminum, silicon, iron, magnesium and other minerals. Ceramic particles made for use as proppants or in gravel packing are manufactured by grinding the ceramic components to fine particle sizes, preferably less than 25 micron particle size, forming a paste of the finely ground material, forming the paste into rounded particles with pelletizing equipment and then sintering the particles. Such particles are sold by Norton Alcoa Proppants of Dallas, Tex. and by Carbo Ceramics Company of Dallas, Tex. We have discovered that the ceramic components of such particles can be mixed with an element which, when bombarded with neutrons, forms a gamma ray emitting isotope, to produce a radioactive particle which has essentially the properties of the ceramic particle not containing the element. Such particles have high strength and resistance to crushing, and can be pumped into a variety of fluid streams without loss of radioactive material to the fluid stream and the conduits for the stream.

MACROLITE ® ceramic spheres sold by 3M Company of St. Paul, Minn. are made from a ceramic powder to have void spaces and specific gravities as low as about 0.58 gm/cc. The particles of this invention can be manufactured by incorporating a target element into the ceramic materials of MACROLITE ® ceramic spheres before they are formed.

It is advantageous to use elements which are not radioactive during formation of the particles, so that health hazards from radioactive materials are avoided during manufacture of the particles. This is an important feature of our invention.

After the particles to be made radioactive, i.e. the precursor radioactive particles, are formed and sintered, the particles may be injected into a flow system or the particles may be transported to a nuclear reactor and radiated with neutrons such that the element present forms a radioactive isotope of that element. The equation given below describes the level of activity resulting from neutron radiation:

$$A = N_f * (g/M) * X_{sect} * h * N_L * (1 - e^{-(0.693/t1/2)} * t/3.7 \times 10^7$$

where:
A = Activity in millicuries
$N_L = 6.022 \times 10^{23}$
h = Isotopic Abundance
$X_{sect}$ = Neutron Capture Cross Section
g = Target element mass in grams
$t_{\frac{1}{2}}$ = Half life of produced nuclide in seconds
$N_f$ = Neutron flux (neutron $cm^{-2} sec^{-1}$)
M = Target nuclide atomic weight in grams
t = Neutron bombardment time in seconds.

Activity produced is directly proportional to neutron bombardment time, neutron flux and target element mass. Once an element has been selected for its half-life of radioactivity and its desirable gamma ray spectrum, the concentration of the element needed to seed the particles and the neutron bombardment time can be calculated for a certain location in a certain nuclear reactor having a known neutron flux rate at different locations. The costs of the element and the neutron irradiation are selected to minimize the total cost of producing particles having an effective level of radioactivity.

The selected amount of the target element is added to a suitable amount of ceramic powder which is to be formed into particles, such that the amount of powder to be irradiated, stored and injected into a stream is convenient for the irradiation facility, storage facilities and pumping equipment available for injecting the radioactive powder.

Twenty millicuries of radioactivity is a common amount of radioactivity to transport in one batch. Therefore, this amount of radioactivity will be used as an example. Other amounts, for example 40 millicuries, are often used and the same principles are applicable. The equation above shows, for example, that if 20 millicuries of radioactivity from iridium-192 is to be produced, and the nuclear reactor produces a flux in the cans to be used in the reactor of $5 \times 10^{12}$ neutrons $cm^{-2}sec^{-1}$, 11.5 milligrams of iridium is needed for a bombardment time of 96 hours. This amount of iridium in the form of iridium black is added to a measured amount of ceramic powder, thoroughly mixed and blended, and formed into particles which are then sintered in accord with known techniques for producing sintered particles. The equation shows that if the amount of target element is doubled the amount of bombardment time can be halved. Therefore, the cost of producing particles having differing amounts of target elements can readily be determined, depending on the cost of the element and the cost of irradiation time. For many elements to be made radioactive, the lowest cost of radioactivity will be obtained with the largest amount of the target element in the ceramic particles. Then the highest limiting concentration of the element is determined by that concentration which changes the physical properties of strength or specific gravity of the ceramic particles into an unacceptable range of the property. Tests should be performed to determine the maximum acceptable concentration of target element by mixing various concentrations of element and ceramic components, sintering the particles and measuring the desired property. Specific gravity of particles may be measured by well known methods. Strength may be measured by crush tests of packed beds of particles or by individual particles strength tests which are well known for testing proppant particles.

For some applications, only a small amount of particles is needed to contain 20 millicuries of radioactivity. But, it is possible to vary the concentration of target element in the ceramic over a wide range of concentrations. The lowest practical level of concentration will normally be determined by the volume available in the reactor used for irradiation or by the pump used to meter the particles into the stream where they will be used. For particles to be used in hydraulic fracturing, 20 millicuries of activity will preferably be contained in a volume of particles in the range from about 5 milliliters to about 100 milliliters of particles. Much larger amounts of particles could be used to contain the radioactivity, but the minimum concentration of target element in the ceramic will usually be determined by the pumping apparatus used to add the particles to a stream and the volume limitations of the reactor used for irradiation of the particles. Small volumes of particles can be used when accurate means are available for metering small amounts of particles into a stream. Radioactivity levels in the range from about 0.02 to about 20.0 millicuries per milliliter of particles are suitable. Preferably, the radioactivity level is in the range from about 0.2 to about 4.0 millicuries per milliliter of particles.

After the particles are radiated with neutrons, their manufacture is complete. The particles must then be handled as radioactive sources. Well known techniques are used for protecting personnel from exposure to gamma rays emitted from the particles.

Radioactive particles are added to a fluid which is being pumped into a well or are added to a fluid passing through surface piping or equipment for other applications by first mixing the radioactive particles with fluid to form a concentrated slurry. The liquid of the slurry may be viscosified by polymers. The slurry of radioactive particles is stored in a small closed radioactive materials reservoir. The reservoir may contain an agitator to keep the radioactive particles in suspension. The slurry is pumped from the reservoir into the low-pressure section of the flow stream to be traced with a low pressure pump such as a peristaltic pump. A high-pressure positive displacement pump can be used when the particles are injected into a high-pressure stream. The concentration of radioactive particles in the concentrated slurry or radioactive particles is usually in the range of about 10 grams to about 1000 grams per gallon of slurry.

Referring to FIG. 1, in one embodiment of this invention particles are formed from a mixture of a ceramic material and a selected element which, when bombarded with neutrons, forms a gamma ray-emitting isotope, the particles are then irradiated with neutrons to form radioactive particles, the particles are added to a fluid before the fluid is injected into a well, the fluid is injected into a well, and afterward the well is logged with an instrument capable of detecting the radioactive particles.

For most applications in wells, the slurry of radioactive particles is pumped out of the reservoir and into the stream at a rate such that 20 millicuries is used to trace from about 10,000 to about 100,000 pounds of solid particles or about 10,000 to about 100,000 gallons of fluid The activity level may vary in the range from about 0.1 to about 10 millicuries per thousand gallons of fluid or thousand pounds of solids. This amount of radioactivity is preferably contained in a volume of particles from about 5 cc to about 100 cc, but much larger volumes of particles may be used with a suitable pump for pumping the slurry of radioactive particles. If this amount of radioactivity is contained in a larger volume of particles, the radioactive particles will either contain a proportionately lower concentration of target element or the particles will be irradiated with neutrons for a proportionately smaller time.

Preferably, the radioactive particles have about the same size and specific gravity as the nonradioactive particles in the flow stream when applied to tracing the particles in hydraulic fracturing and gravel packing operations. The particles should be small enough to produce low settling rates when used in cement slurries. For other types of fluids, the size and specific gravity will be selected to accomplish the purpose of the tracing application. For example, particles less than a certain size may be sieved from a mixture of sizes and added to a flow stream to determine the size of constrictions in the flow stream. Other applications dependent on size and specific gravity will be obvious to users of the particles.

Specific gravity of the particles can be varied to be compatible with the application. The ceramic particles produced for hydraulic fracturing of wells vary in specific gravity from about 2.6 gm/cc to about 3.8 gm/cc. The density of these particles will not be significantly changed when the element to be made radioactive is embedded into the particles. Preferably, radioactive particles will be made to have approximately the same density as the non-radioactive particles with which they are used. Particles sold by 3M Company under the trademark MACROLITE ® may have a specific gravity as low as 0.58 gm/cc. Again, preferably the radioactive particles will be made to approximately match the density of the non-radioactive particles. Strength of the particles will also vary with specific gravity, but even the relatively low strength of these low specific gravity particles will adequate for gravel packing applications. Other applications not requiring high-strength can also use the low specific gravity particles. To avoid breaking and abrasion of particles, which can lead to loss of radioactivity from the particles, strength is preferably as high as consistent with other properties of the particles.

After the radioactive particles are pumped into a well and out of the casing of the well so that they are no longer in the wellbore, a logging instrument is lowered into the well which is capable of detecting the gamma rays emitted by the isotope of the element. The gamma rays are capable of penetrating at least several inches of the earth surrounding the well and of penetrating the casing in the well. The gamma rays specific to the isotope of the element may be detected by performing an analysis of the energy of the gamma rays detected by the logging tool. A spectrum of energy of gamma rays characteristic of each radioactive element present is obtained. Techniques are used for determining, based on differing attenuation by Compton scattering of gamma rays having differing energy levels, the amount of gamma radiation coming from inside the wellbore, which would result from radioactive material lost from the particles during flow down the wellbore.

Ceramic particles containing different target elements may be used at the same time or at different times in the pumping operation, may have different specific gravity or may have different size. The locations of the particles having different target elements are then determined with the gamma ray detector.

In gravel packing operations, the radioactive particles may be inside the casing and outside a screen or other type filter in the wellbore. In this application, also, the logging tool is surrounded by the radioactive particles.

In a flow stream or other surface apparatus, the gamma ray detection instrument is located in the vicinity of the radioactive particles to detect the gamma rays. Particle location of particles containing different target elements, which may also have different sizes and specific gravities, can be determined by spectral analysis of the gamma rays.

The applications described above assumed that the particles had been irradiated by neutrons before injection into the well or flow stream. It should be understood that the precursor particles, obtained after sintering and before irradiation with neutrons, can be used in all applications if a neutron source is applied to the particles after they are in the flow stream or well. The particles of this invention will be stable to their environment of use, and can be irradiated or re-irradiated long after the time they are injected into a flow stream or well.

Example

Ceramic particles containing iridium were manufactured. The procedures normally used for manufacturing a ceramic proppant particle containing primarily alumina and silica and smaller amounts of other oxide minerals were used. The ceramic materials were finely ground. About 20 grams of iridium black, available from Aldrich Chemical Company, was thoroughly mixed with 30,418 grams of the ceramic powder. The powdered mixture was then formed into a paste containing chemical binders. The paste was formed into approximately spherical particles. The ceramic materials are said to be "green" at this stage. The green ceramic particles were then sintered by firing in an oven at a temperature in the range of about 1400° to 1500 ° C. The particles containing the iridium were essentially the same density and crush resistance as the particles of high strength ceramic material without the iridium. The size range of the particles was from about 20 mesh to about 40 mesh.

A portion of the particles containing iridium was then placed in a nuclear reactor for a period of 42 hours. A volume of 15 milliliters of particles was irradiated at a neutron flux of $9 \times 10^{12}$ neutrons cm$^{-2}$ sec$^{-1}$. At the end of irradiation, the activity of the particles was measured to be about 20 millicuries. The activity calculated from above equation was 20.7 millicuries.

The radioactive particles are transported to a well where hydraulic fracturing operations are performed. Fracturing fluid is pumped down the casing of the well and through perforations. Sand in the size range 20–40 mesh is used as proppant. Radioactive ceramic particles manufactured according to the methods described herein are added to the fluid along with the sand at an appropriate time. The ceramic radioactive particles have about the density of sand and are 20–40 mesh size. After these fracturing operations are complete, the well is logged with the TRACERSCAN system. Results of the log show that gamma ray radiation from iridium is present only near the perforations. The very low level of radioactivity in the wellbore above the perforations shows that loss of radioactive iridium material from the particles during the operations is negligible.

The invention has been described with reference to its preferred embodiments. Those of ordinary skill in the art may, upon reading this disclosure, appreciate changes or modifications which do not depart from the scope and spirit of the invention as described above or claimed hereafter.

What we claim is:

1. A method of locating particles pumped into a well drilled through a subterranean formation comprising:
   (a) forming a mixture of (1) an element which when bombarded with neutrons forms a gamma ray-emitting isotope and (2) a ceramic material which when properly processed forms a ceramic particle;
   (b) forming particles of the mixture;
   (c) irradiating the particles with neutrons to form radioactive particles;
   (d) adding the particles to a fluid before the fluid is injected into a well at a concentration effective to allow subsequent detection;
   (e) injecting the fluid and the particles into a well; and
   (f) logging the well with an instrument capable of detecting the radioactive particles to determine the location of the particles in and around the well.

2. The method of claim 1 wherein the radioactive particles are added to the fluid in a concentration range from about 0.1 ml/1000 gallons to about 10 ml/1000 gallons.

3. The method of claim 1 wherein the instrument used in step (f) is capable of detecting the spectrum of energies of gamma rays emitted by the isotope of the element in the radioactive particles.

4. A method of tracing particles by providing in a fluid particles traceable by radioactivity, said method comprising adding particles to said fluid wherein said particles are comprised of a sintered ceramic material having embedded therein a target element, said target element being non-radioactive until said particles are bombarded with neutrons, and thereafter employing apparatus to detect radioactivity from said particles to determine the location of the particles.

5. A method as defined in claim 4 wherein said particles are bombarded with neutrons after said particles are added to said fluid.

6. A method as defined in claim 4 wherein differing particles having differing target elements are added to said fluid.

7. A method as defined in claim 4 wherein said particles are added to said fluid in a range of concentration from about 0.1 ml/1000 gallons to about 10 ml/1000 gallons.

8. A method as defined in claim 4 wherein said target element is present in said particles at a concentration in the range from an amount detectable by said apparatus to about 5 percent weight.

9. A method as defined in claim 4 wherein said fluid is a slurry.

10. A method as defined in claim 9 wherein the specific gravity of said particles is selected to match approximately the specific gravity of particles in said slurry.

11. A method of treating a well drilled through a subterranean formation comprising introducing a slurry into said well, said slurry having suspended therein particles, said particles being comprised of a sintered ceramic material having embedded therein a target element, said target element being non-radioactive until said particles are bombarded with neutrons.

12. A method as defined in claim 11 wherein said method of treating said well is hydraulic fracturing.

13. A method as defined in claim 11 wherein said method of treating said well is gravel packing.

14. A method as defined in claim 11 wherein particles having differing target elements are introduced into said well at differing times.

15. A method of locating particles in and near a well comprising logging said well using logging apparatus capable of detecting radioactivity and thereby determining the proximity of said particles to said logging apparatus, said well having been treated with a fluid having suspended therein particles, said particles comprising a sintered ceramic material having embedded therein a target element, said target element being non-radioactive until said particles are bombarded with neutrons.

16. A method as defined in claim 15 wherein said target element is present in said particles at a concentration in the range from an amount detectable by said logging apparatus to about 5 percent by weight.

17. A method of treating a well drilled through a subterranean formation comprising introducing a cement slurry into said well, said cement slurry having suspended therein particles, said particles being comprised of a sintered ceramic material having embedded therein a target element, said target element being non-radioactive until said particles are bombarded with neutrons.

18. The method as defined in claim 17 wherein said particles are bombarded with neutrons before said cement slurry is introduced into said well.

19. The method as defined in claim 17 wherein said particles are bombarded with neutrons after said cement slurry is introduced into said well.

* * * * *